United States Patent [19]

Brill

[11] Patent Number: 5,031,918
[45] Date of Patent: Jul. 16, 1991

[54] MAGNIFYING MARKER FOR A GAME BOARD

[75] Inventor: Jerome Brill, Hazel Park, Mich.

[73] Assignee: Fred Silber Compamy, Ferndale, Wis.

[21] Appl. No.: 513,619

[22] Filed: Apr. 24, 1990

[51] Int. Cl.⁵ .................... A63F 3/06; G02B 27/02; G02B 3/00

[52] U.S. Cl. .................... 273/288; 273/269; 273/DIG. 14; 350/410; 350/432; 350/436; 350/114; D16/135; D21/53

[58] Field of Search ............... 273/269, 288, DIG. 14, 273/DIG. 16; 350/410, 409, 412, 432, 436, 114–116; D16/139-136; D21/53

[56] References Cited

U.S. PATENT DOCUMENTS

| | | | |
|---|---|---|---|
| 1,137,444 | 4/1915 | Adams | 350/410 |
| 1,543,870 | 6/1925 | Prange | 350/410 |
| 2,026,176 | 12/1935 | Jaeckel | 350/410 |
| 2,151,573 | 3/1939 | Stanley | 350/410 |
| 2,847,222 | 8/1958 | Weeks | 273/288 |
| 3,413,004 | 11/1968 | Smith | 273/272 |
| 3,734,506 | 5/1973 | Gingrass | 273/272 |
| 4,427,198 | 1/1984 | LaRue | 273/269 |
| 4,949,978 | 8/1990 | Berner | 273/288 |

FOREIGN PATENT DOCUMENTS

| | | | |
|---|---|---|---|
| 1002547 | 3/1952 | France | 273/288 |
| 4612 | 5/1911 | United Kingdom | 273/288 |
| 2066085 | 7/1981 | United Kingdom | 273/239 |

OTHER PUBLICATIONS

Parker Brother's game entitled "PENTE" –(Commercially available).

"Spotters" and Power Crystals, Bertex Industries, Inc., Feb. 28, 1990.

*Primary Examiner*—Benjamin Layno
*Attorney, Agent, or Firm*—Krass & Young

[57] ABSTRACT

A marker for use in playing lotto games such as bingo is made from a transparent rigid material having a flat bottom surface and a convex upper surface. The marker is sized to cover the indicia on the bingo card and to magnify the indicia thereunder. The marker has a convexly curved downwardly facing shoulder extending between the upper surface and bottom surface. The upper surface, shoulder and bottom surface form a continuous curvilinear surface which provides a magnified view free from double images.

16 Claims, 1 Drawing Sheet

MAGNIFYING MARKER FOR A GAME BOARD

TECHNICAL FIELD

This invention relates to games and more particularly board games like bingo.

BACKGROUND OF THE INVENTION

Transparent markers for board games such as bingo or other lotto-type games are desirable because the markers, when placed on the number of other visible indicia, do not hide or obscure the covered number. It is desirable to have the called numbers remain visible, particularly for people who play more than one card simultaneously. Many people play a great number of cards at a time. The people who simultaneously play numerous cards still like to see the called numbers through the card for various reasons. If they are not sure a number was called on one of their boards, they can double check another one of their boards and at a glance verify if any of the same numbers are covered by the same marker. This verification would be impossible in certain situations where a lot of numbers have been called and the pace of the Bingo game is quick. A player does not have time to lift each and every marker in an attempt to find if a particular number was called.

Secondly, if the player's card happens to win, the player does not have to lift the markers to call out the numbers to confirm the winning card and, if the player is wrong, only the incorrectly placed marker needs to be removed.

Bingo games are particularly attractive to retired and other elderly people who might have less than perfect eyesight or hand dexterity. Even though many bingo cards have large numbers, some of the participants may want additional aids to see the numbers. As such, what is needed is a transparent marker which magnifies the numbers or other game indicia that is covered by the marker. Furthermore, the markers must be constructed to be easily picked up and otherwise handled. Furthermore, what is needed is markers that have different colored tints in which one tint is used to indicate uncalled numbers and a different tint is used to indicate that the number underneath has been called.

SUMMARY OF THE DISCLOSURE

In accordance with one embodiment of the invention, a bingo board game includes a game board having a plurality of visible indicia such as numbers set forth in a matrix pattern. A plurality of markers being made at least in part from a transparent material are sized to cover the plurality of numbers. The transparent material is shaped to function as a magnifying lens and material is substantially horizontally disposed above the game board such that it magnifies the numbers thereunder.

Preferably the marker is a transparent one-piece member having a flat bottom surface that can rest on the game board. The marker has an upper surface that is constructed to cause magnification of the indicia on the game board. Preferably the top surface is convex. It is also desirable that the marker has a bottom facing peripheral flange or shoulder above the bottom surface to facilitate picking up the marker.

The markers can have various colorations. One set of markers can be uncolored or clear and the others can be tinted such that one of the marker colorations can be designated for uncalled numbers and placed on every spot on a bingo card at the beginning of the game. The remaining colors can be designated for called numbers. That way all of the indicia can be magnified whether they are called or not. Preferably, the marker is made from a rigid transparent material such as a glass material or a rigid plastic material.

BRIEF DESCRIPTION OF THE DRAWING

Reference is now made to the accompanying drawings in which.

DETAILED DESCRIPTION OF THE PREFERRED EMBODIMENT

Figure 1:
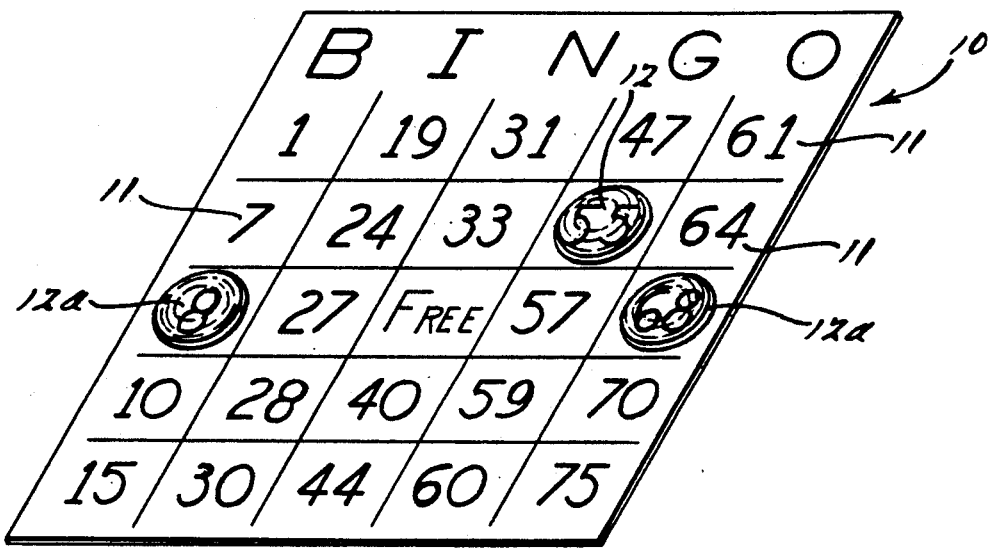
FIG. 1 illustrates a bingo game assembly with a conventional game card and markers in accordance with the invention.

Referring to FIG. 1, the bingo card 10 has a plurality of numbers set forth in a matrix pattern. On the card are a number of one-piece markers 12 and 12a in accordance with the invention. The markers 12 and 12a are sized to fully cover the numbers 11. The markers 12a are made from a transparent tinted glass. The markers 12a can have a different coloration than markers 12a or have no coloration. Other than different coloration, markers 12a are constructed the same as marker 12 and all future references will be directed only to marker 12. Marker 12 as more clearly shown in FIG. 3, has a flat bottom surface 14 and a top convex surface 16. The flat bottom surface 14 rests on game board 10 to cover number 11. A bottom facing shoulder 21 or curvature rises from bottom surface 14 to the periphery 23 to facilitate easy picking up of the marker. The marker periphery 23 is spaced above game board 10 and is generally circular in shape. The finger and thumb can be used to grab at point 23 and abut shoulder 21.

Figure 3:
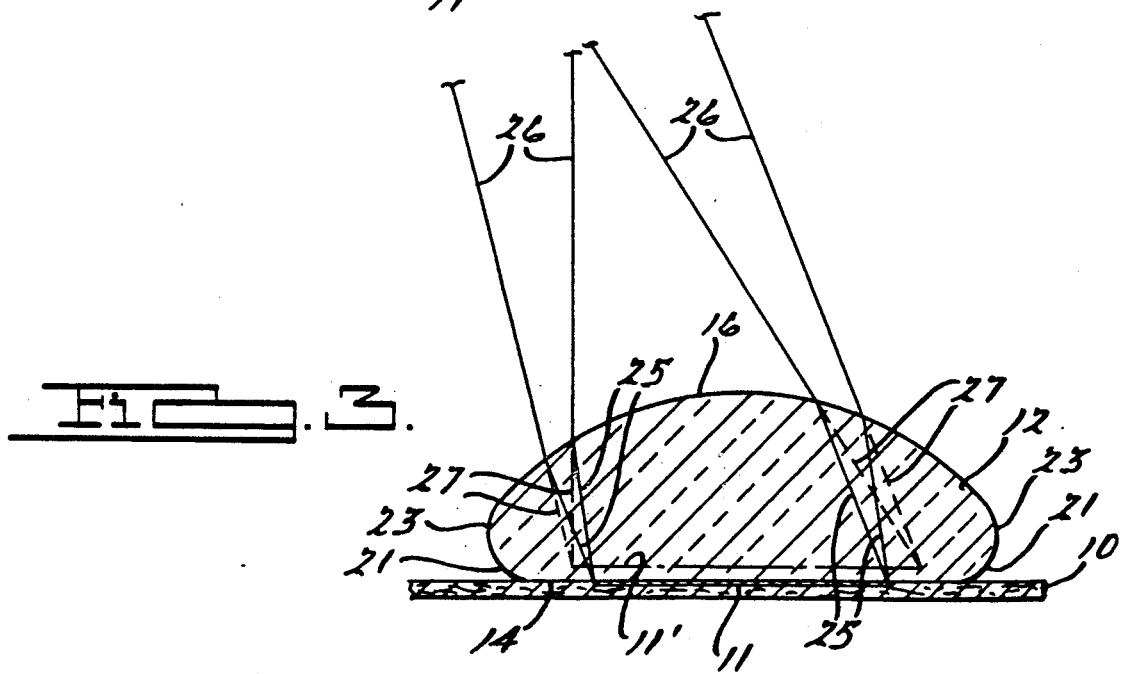
FIG. 3 is a side elevational view of the marker and game card shown in FIG. 2 illustrating the magnification of the number thereunder.

The shoulder 21 is convexly curved such that it forms a continuous curvilinear surface with the periphery 23 and the top surface 16 as shown in FIG. 3. The planoconvex configuration for the lens marker facilitates an inexpensive manufacturing for the marker, provides a magnified image of a numeral positioned under the marker, and provides for a magnified view free from double images which can occur with markers of the prior art that have an edge or corner between the upper convex surface and side periphery. The shoulder also facilitates ease for one placing the marker down and picking up the marker from the game board.

Figure 2:
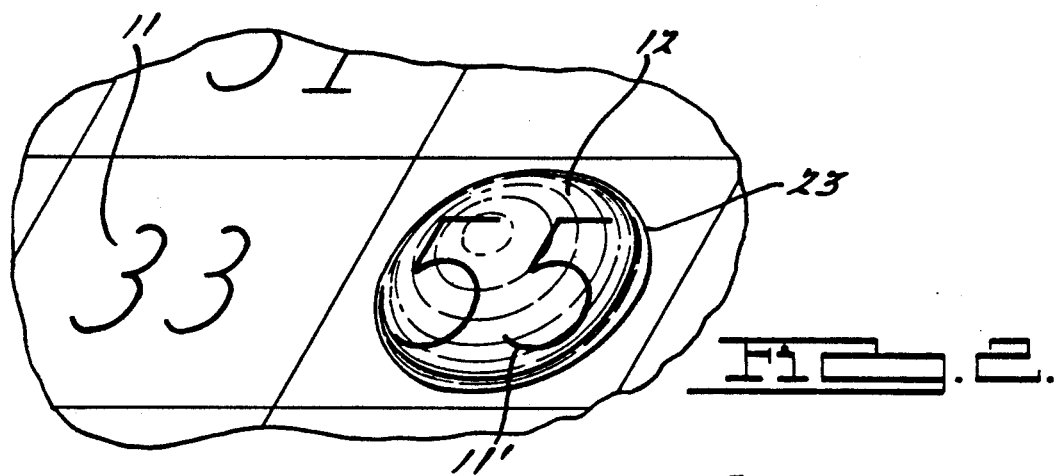
FIG. 2 is an enlarged fragmentary view of a portion of FIG. 1.

As shown in FIG. 3, an observer when viewing the number 11 under the marker 12, sees an enlarged image 11' which lies slightly above the surface of the game board 14. The solid lines 25 represent light rays from number 11 defracted through the marker 12 to the direction shown by lines 26. The phantom lines 27 represent extensions of solid line 28 to create image 11'. FIG. 2 illustrates the comparative sizes between the unmagnified number 11 and the magnified image 11'.

The marker 12 can have a choice of various colorations for example an non-tinted clear glass or a pastel blue, green or yellow. The markers 12 can be used in a variety of ways. In one way, the bingo card 10 starts off with no markers 12 and as numbers are called the markers 12 are placed on the called numbers. A player when he has a selected spot or number of interest can place a marker of particular coloration on the number of a spot of interest. As the game proceeds, the player can glance at these markers of particular coloration to see if he won. This procedure of using a particular transparent marker of particular coloration gives a player an edge over another player who does not use this procedure.

The mixture of tint and non-tinted markers can be used to cover all the numbers and 11. Non-tinted markers 12 can be used to cover uncalled numbers and the tinted markers can be used to indicate called numbers. As such, all of the numbers 11 on the bingo card can be magnified as a visual aid for the participant.

In this fashion, a transparent marker is used to mark, magnify and highlight numbers for a lotto-type game and are constructed to be easily picked up and replaced.

Variations and modifications of the present invention are possible without departing from the scope and spirit as defined in the appended claims.

The embodiments of the invention in which an exclusive property or privilege is claimed are as follows:

1. A bingo game assembly characterized by:
    a bingo game board having a plurality of individual visible indicia set forth in a matrix pattern thereon;
    a plurality of transparent markers sized to cover said plurality of individual indicia;
    said plurality of markers having a substantially flat bottom surface constructed to be above said plurality of individual indicia and a convex upper surface to magnify said plurality of individual indicia;
    said plurality of markers having a periphery spaced above said game board and a downwardly facing shoulder extending between said periphery and said flat bottom surface;
    said downwardly facing shoulder being convexly curved from said substantially flat bottom surface to said periphery; and
    said shoulder, periphery, and convex upper surface forming a continuous curvilinear surface.

2. A bingo game assembly as defined in claim 1 further characterized by:
    said plurality of markers being made from a transparent material and having a plurality of colorations.

3. A bingo game assembly as defined in claim 2 further characterized by:
    said transparent material being substantially rigid.

4. A bingo game assembly as defined in claim 1 further characterized by:
    said plurality of markers being substantially rigid.

5. A bingo game assembly as defined in claim 4 being characterized by:
    said plurality of markers having a plurality of colorations.

6. A bingo game assembly as defined in claim 5 further characterized by:
    said plurality of markers being made from solid glass.

7. A bingo game assembly as defined in claim 1 further characterized by:
    said substantially flat bottom surface being sized to cover said individual indicia.

8. A bingo game assembly characterized by:
    a bingo game board having a plurality of visible indicia set forth in a matrix pattern thereon;
    a plurality of markers being made at least in part from a transparent material;
    said transparent material constructed such that it is a magnifying lens;
    said plurality of markers each having a base section such that the magnifying lens is horizontally positioned over the game board to magnify said plurality of visible indicia.
    each base section having a bottom surface constructed to rest on said bingo game board;
    each magnifying lens having a convex upper surface;
    said plurality of markers each having a periphery spaced above said game board and downwardly facing shoulder extending between said periphery and said bottom surface; and
    said periphery, said shoulder, and said convex upper surface forming a continuous curvilinear surface.

9. A marker for a bingo game card, said marker characterized by:
    said marker being made from a transparent material;
    said marker having a substantially flat bottom surface adapted to sit on said bingo game card;
    said marker sized to cover a number of said bingo game card;
    said marker having a convex upper surface to magnify said number of said card under said flat bottom surface;
    said marker having a periphery spaced above said game card and a downwardly facing shoulder extending between said periphery and said flat bottom surface;
    said downwardly facing shoulder being convexly curved from said substantially flat bottom surface to said periphery; and
    said shoulder, periphery, and convex upper surface forming a continuous curvilinear surface.

10. A marker as defined in claim 9 further characterized by:
    said transparent material being tinted.

11. A marker as defined in claim 10 further characterized by:
    said transparent material being substantially rigid.

12. A marker as defined in claim 11 further characterized by:
    said transparent material being glass.

13. A marker as defined in claim 9 further characterized by:
    said substantially flat bottom surface being sized to cover a number of said bingo game card.

14. A bingo game assembly characterized by:
    a bingo game board having a plurality of individual indicia set forth in a matrix pattern thereon;
    a plurality of transparent markers being sized to cover said plurality of individual indicia;
    said plurality of markers having a bottom surface constructed to rest on said bingo game board and sit over said plurality of individual indicia;
    a magnifying means in said markers for magnifying said plurality of individual indicia;
    said plurality of markers having a periphery spaced above said game board and a downwardly facing shoulder extending between said periphery and said bottom surface;
    said magnifying means for magnifying includes each marker having a convex upper surface; and
    said periphery, said shoulder, and said convex upper surface forming a continuous curvilinear surface.

15. A bingo game assembly comprising a bingo game board having a plurality of individual visible indicia appearing in a matrix thereon; a plurality of transparent markers sized to cover individual indicia on the game board characterized in that each marker comprises a lens marker having a plano-convex configuration with the outer periphery to the convex upper surface connected to the outer periphery of the flat bottom surface by a rounded peripheral shoulder forming a continuous curvilinear surface with said upper convex surface.

16. A bingo game assembly as defined in claim 15 further characterized by:
   said markers being tinted in one of a plurality of colors.

* * * * *